United States Patent
Matsui

(10) Patent No.: US 6,961,294 B2
(45) Date of Patent: Nov. 1, 2005

(54) OPTICAL INFORMATION RECORDING APPARATUS FOR CONTROLLING A POWER LEVEL OF RECORDING

(75) Inventor: Masakatsu Matsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 570 days.

(21) Appl. No.: 09/995,181

(22) Filed: Nov. 28, 2001

(65) Prior Publication Data

US 2002/0063943 A1 May 30, 2002

(30) Foreign Application Priority Data

Nov. 30, 2000 (JP) ........................................ 2000-364494

(51) Int. Cl.$^7$ ............................................... G11B 7/125
(52) U.S. Cl. ................... 369/53.27; 369/47.51
(58) Field of Search ........................... 369/53.27, 47.51

(56) References Cited

U.S. PATENT DOCUMENTS

| | | | |
|---|---|---|---|
| 4,689,795 A | * 8/1987 | Yoshimoto et al. | ........... 372/31 |
| 4,796,267 A | * 1/1989 | Yamada et al. | .......... 372/29.02 |
| 5,029,155 A | * 7/1991 | Kenjo | ........................ 369/116 |
| 5,881,044 A | * 3/1999 | Park et al. | ............... 369/47.51 |
| 6,222,815 B1 | 4/2001 | Nagano | |
| 6,418,102 B1 | * 7/2002 | Suga | ......................... 369/47.53 |
| 6,618,334 B1 | * 9/2003 | Yamamoto | ............... 369/47.51 |

FOREIGN PATENT DOCUMENTS

| | | |
|---|---|---|
| EP | 1 033 705 A2 | 9/2000 |
| JP | 9-270128 | 10/1997 |
| JP | 11-250459 | 9/1999 |

* cited by examiner

Primary Examiner—Hoa T. Nguyen
Assistant Examiner—Michael V. Battaglia
(74) Attorney, Agent, or Firm—Dickstein Shapiro Morin & Oshinsky LLP

(57) ABSTRACT

An information recording apparatus controls a recording power to be optimal without using a high-rate sampling circuit even when a recording condition changes. A laser diode emits a light at a first optical amount value and a second optical amount value greater than the first value. The light emitted by the laser diode is irradiated onto an optical disc. A signal level value of the reflected light is detected by a sample hold circuit or a low-pass filter, and one of the outputs of the low-pass filter and the signal hold circuit is selected in accordance with an instruction for selection. The sample hold circuit detects the signal level value of a sampled reflected light. The low-pass filter outputs an average value of the signal level value. A drive current driving the laser diode is adjusted by comparing the signal level values before recording information and after starting information recording.

18 Claims, 5 Drawing Sheets

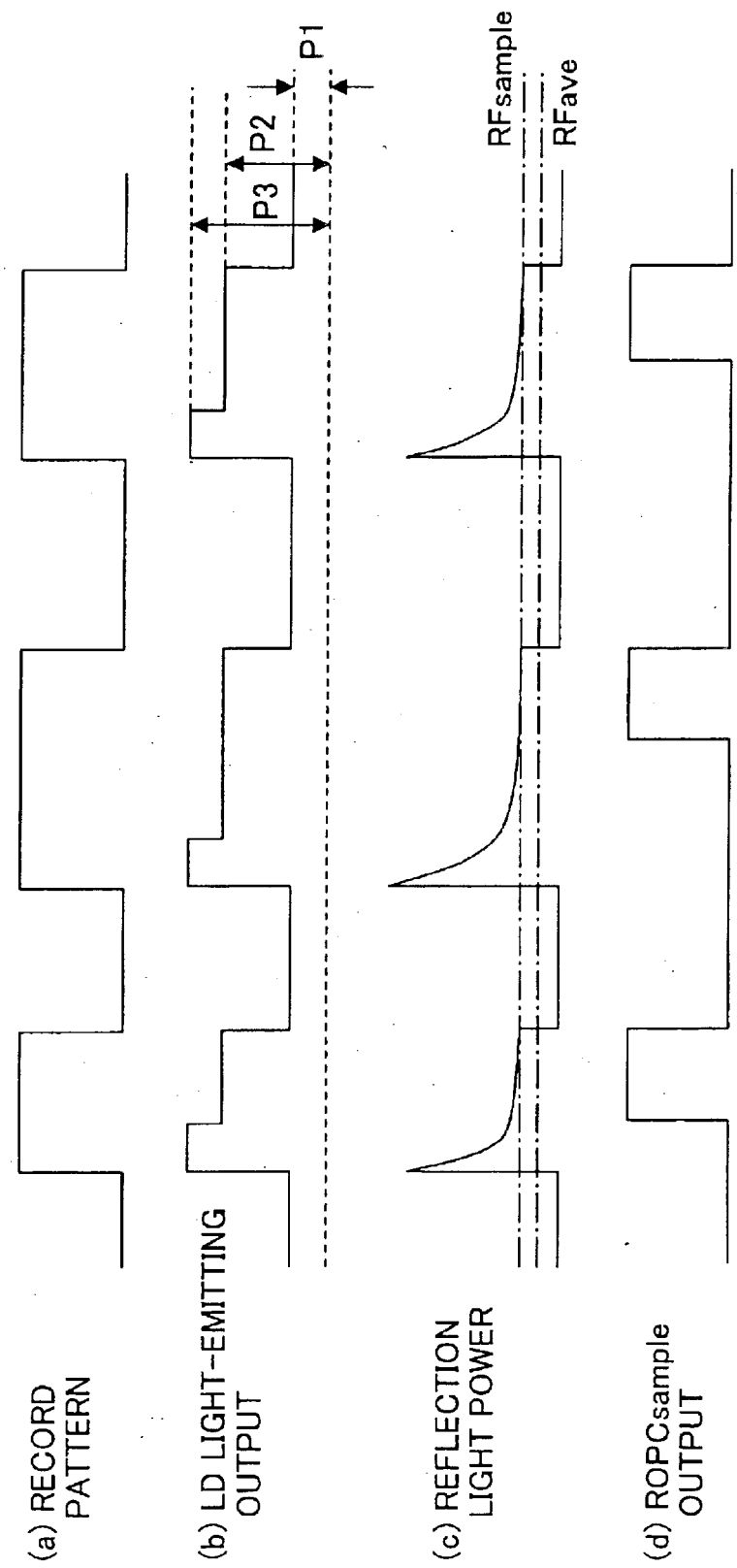

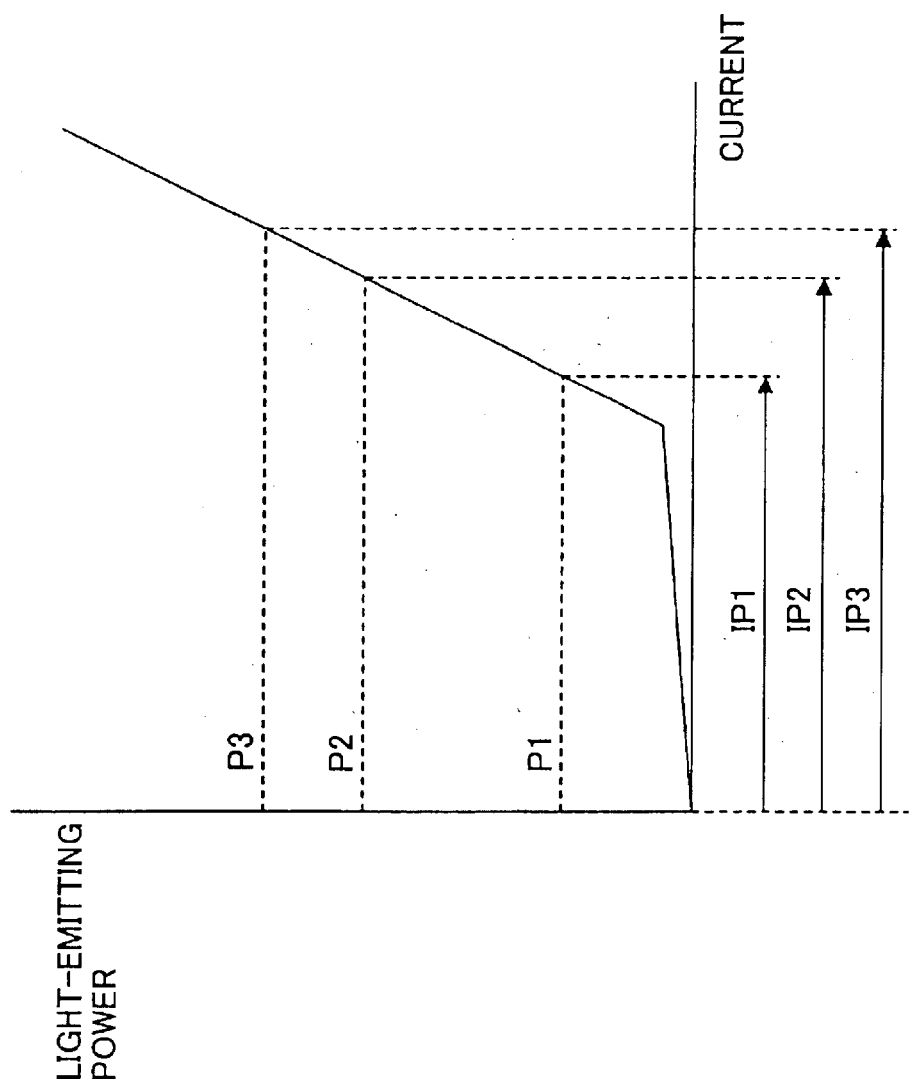

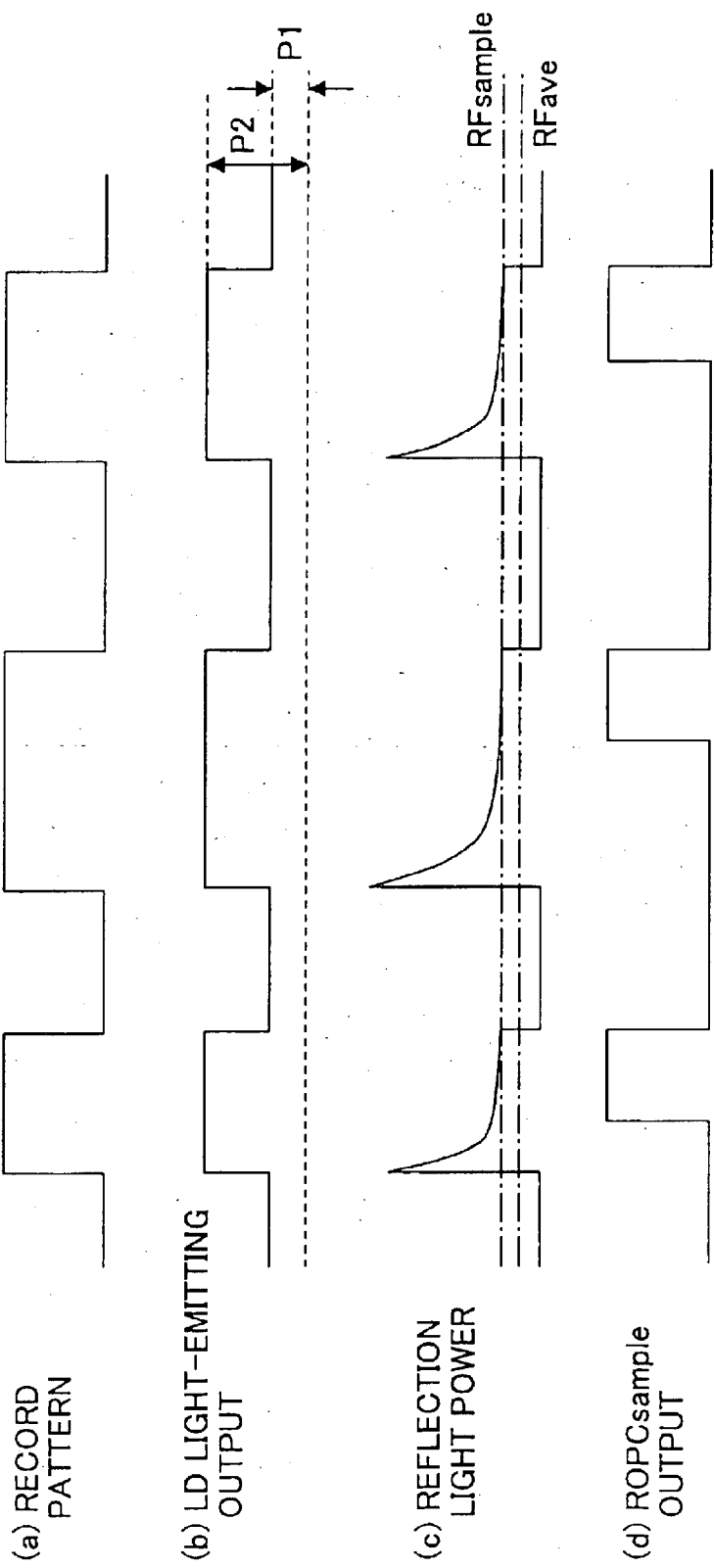

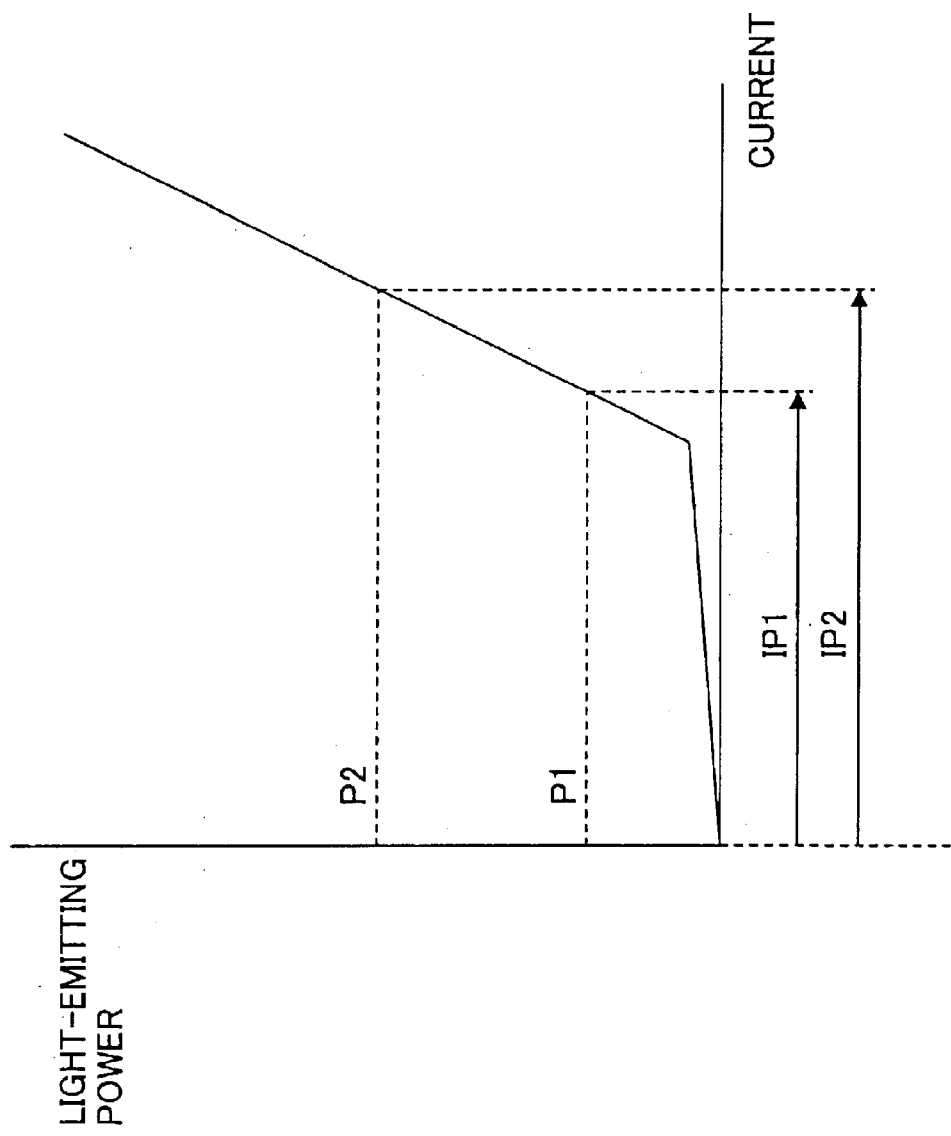

OPTICAL INFORMATION RECORDING APPARATUS FOR CONTROLLING A POWER LEVEL OF RECORDING

BACKGROUND OF THE INVENTION

1. Field of the Invention

The present invention generally relates to information recording apparatuses and, more particularly, to an optical information recording apparatus provided with an optical amount control device for controlling a light-emitting power of a light source such as a semiconductor laser.

2. Description of the Related Art

In recent years, many information recording apparatuses, which record information on an optical recording medium such as a CD-R/RW, are used. For example, Japanese Laid-Open Patent Application No. 9-270128 discloses an information recording apparatus in which a light reflected by an optical disc is received by a photodetector during a recording of information, and a maximum value of an intensity of the reflected light from a pit part and an intensity of the reflected light after a reference time has passed from the tip of the pit part are extracted by a peak hold detection circuit and a sample hold circuit. The information recording apparatus detects a maximum value of intensities of lights reflected by a plurality of pits and intensities of sampled lights reflected by the pits for several frames in a practical recording area when starting information recording on the optical disc. The information recording apparatus obtains the maximum value of the intensities of the reflected lights and the intensity of the sample reflected light in accordance with the result of the detection. That is, the information recording apparatus detects the maximum intensity of the reflected lights and the intensity of the sampled reflected lights from the pit parts at the time of starting an information recording. The information recording apparatus compares the result of the detection with a reference value, and carries out a running optical power calibration (running OPC), which corrects a laser light in accordance with the result of the comparison.

Generally, when recording information on an optical disc, an optical disc apparatus generates a recording laser beam having a power higher than that used for reading.

In a case of an optical disc having a recording surface formed of an organic colorant recording film such as a recordable compact disc (CD-R), a semiconductor laser source emits a laser light alternately at a read power having P1 level and a write power having P2 level. The write power is set to be larger value than the read power (P2>P1). A pit is formed in the place where the laser light having the P2 level light-emitting power is irradiated on a recording surface, and the place where the laser light having the P1 level light-emitting power is irradiated corresponds to a space.

Moreover, P3 level higher than P2 level (P3>P2) may be set, and a recording power waveform may be generated according to three values of P1 level, P2 level and P3 level. A laser light having the P3 level record power is directed to a head of each pit so as to acuminate a leading edge of the pit.

The record power of the three values is also used when recording on a phase change type rewritable recording medium such as a rewritable compact disc (CD-RW). By repeatedly irradiating the P3 level light-emitting power laser light and the P1 level light-emitting power laser light at a high speed, the laser irradiated part on a recording surface is changed to an amorphous state. Then, the portion of the amorphous state is crystallized by continuously irradiating the P2 level light-emitting power laser light so that the crystallized portion represents information. The P2 level power and the P3 level power are determined, when writing information on an optical disc such as, for example, a CD-R/RW, by carrying out an optical power calibration of a recording laser power in a power calibration area (PCA) provided in an innermost portion of an optical disc before recording information.

However, the apparent laser power can change due to a change in a writing area of an optical disc, a temperature change with passage of time or a surface deflection and an eccentricity of an optical disc. Therefore, even if a recording starts at an optimal power determined by the PCA, it will be no longer optimal when it reaches a recording surface. Then, in the above-mentioned information recording apparatus, a laser power optimization method referred to as a running OPC method is carried out while recording information. In the running OPC method, the laser light reflected by the optical disc under a writing operation is sampled at a timing to emit a light at a high power to form a pit. Then, the sampled signal is monitored so as to be compared with a monitor signal similar to that when the OPC is carried out, and the power of the emitted laser is controlled to always be optimized so that the sampled signal and the monitored signal are at the same level.

However, in the conventional information recording apparatus which performs the above-mentioned running OPC, the record power at the time of actual recording on an optical disc changes from an optimum power due to external factors such as a change in a writing area of an optical disc, a temperature change with passage of time or a surface deflection and an eccentricity of an optical disc.

Additionally, since a modulation rate becomes extremely high when a recording speed is increased, a time during which the P2 level power is maintained is reduced, which requires a high-rate sampling circuit. However, generally, it is difficult to realize a high-rate sampling circuit, and even if it is realized, there will be a problem of a high cost. Then, if an inexpensive regular sampling circuit is used, there is a problem in which a recording power becomes inaccurate.

SUMMARY OF THE INVENTION

It is a general object of the present invention to provide an improved and useful optical information recording apparatus in which the above-mentioned problems are eliminated.

A more specific object of the present invention is to provide an information recording apparatus which controls a recording power to be always optimal without using a high-rate sampling circuit even when a recording condition is changed.

In order to achieve the above-mentioned objects, there is provided according to one aspect of the present invention a light amount control device comprising: light source driving means for driving a light source to emit a light at a first optical amount level value and a second optical amount level value greater than the first optical amount level value; anterior reflected light signal level detecting means for irradiating the light emitted from the light source onto a recording medium and detecting a signal level value of the reflected light reflected by the recording medium before recording information on the recording medium; reference level value retaining means for retaining the detected signal level value as a reference level value; posterior reflected light signal level detecting means for irradiating the light emitted from the light source onto the recording medium and detecting a signal level value of the reflected light reflected by the recording medium after starting information recording on the recording medium; comparing means for comparing the detected signal level value with the reference level value retained by the reference level value retaining means; and drive current adjusting means for adjusting a drive current which drives the light source to emit the light based on a result of the comparison of the comparing means, wherein each of the anterior reflected light signal level value detecting means and the posterior reflected light signal level value detecting means includes: first reflected light signal level value detecting means for detecting a second optical amount level value of the reflected light reflected by the recording medium; second reflected light signal level value detecting means for detecting an average value of the signal level value of the light emitted by the light source; and detection place selecting means for selecting one of outputs of the first reflected light signal level value detecting means and the second reflected light signal level value detecting means in accordance with an instruction for selection.

Additionally, there is provided according to another aspect of the present invention a light amount control device comprising: light source driving means for driving a light source to emit a light at a first optical amount level value, a second optical amount level value greater than the first optical amount level value and a third optical amount level value greater than the second optical amount level value; anterior reflected light signal level detecting means for irradiating the light emitted from the light source onto a recording medium and detecting a signal level value of the reflected light reflected by the recording medium before recording information on the recording medium; reference level value retaining means for retaining the detected signal level value as a reference level value; posterior reflected light signal level detecting means for irradiating the light emitted from the light source onto the recording medium and detecting a signal level value of the reflected light reflected by the recording medium after starting information recording on the recording medium; comparing means for comparing the detected signal level value with the reference level value retained by the reference level value retaining means; and drive current adjusting means for adjusting a drive current which drives the light source to emit the light based on a result of the comparison of the comparing means, wherein each of the anterior reflected light signal level value detecting means and the posterior reflected light signal level value detecting means includes: first reflected light signal level value detecting means for detecting one of the second optical amount level value and the third optical amount level value of the reflected light reflected by the recording medium; second reflected light signal level value detecting means for detecting an average value of the signal level value of the light emitted by the light source; and detection place selecting means for selecting one of outputs of the first reflected light signal level value detecting means and the second reflected light signal level value detecting means in accordance with an instruction for selection, and wherein the drive current adjusting means includes means for adjusting the drive current supplied to the light source so as to cause the light source to emit the light at the reference level value in accordance with a result of comparison of the comparing means when the light source emits the light at the second optical amount level value, and for adjusting the drive current supplied to the light source so as to cause the light source to emit the light at the third optical amount level value in accordance with an efficiency value obtained by a relationship between a value corresponding to the second optical level value and a value corresponding to the drive current.

In the light amount control device according to the present invention, the instruction for selection may be determined based on a digital modulation rate of the light source. Additionally, the instruction for selection may be determined so as to cause the detection place selecting means to select the output of the first reflected light signal level value detecting means when the digital modulation rate of the light source is low, and to select the output of the second reflected light signal level value detecting means when the digital modulation rate of the light source is high. Further, the instruction for selection may be determined based on a kind of the recording medium.

Additionally, there is provided according to the present invention an information recording apparatus for recording information on a recording medium by irradiating a light from a light source, the information recording apparatus being provided with the above-mentioned light amount control device. The information recording apparatus according to the present invention may be incorporated into a computer.

Other objects, features and advantages of the present invention will become more apparent from the following detailed description when read in conjunction with the accompanying drawings.

BRIEF DESCRIPTION OF THE DRAWINGS

FIG. 2 is a waveform chart showing a change in a signal waveform in a running OPC control process performed by the optical disc apparatus shown in FIG. 1;

FIG. 3 is a graph showing a current versus record power characteristic of a laser diode shown in FIG. 1;

FIG. 4 is a waveform chart showing a change in a signal waveform in a running OPC control process performed by the optical disc apparatus shown in FIG. 1; and FIG. 5 is a graph showing another current versus record power characteristic of the laser diode shown in FIG. 1.

DETAILED DESCRIPTION OF THE PREFERRED EMBODIMENT

Figure 1:
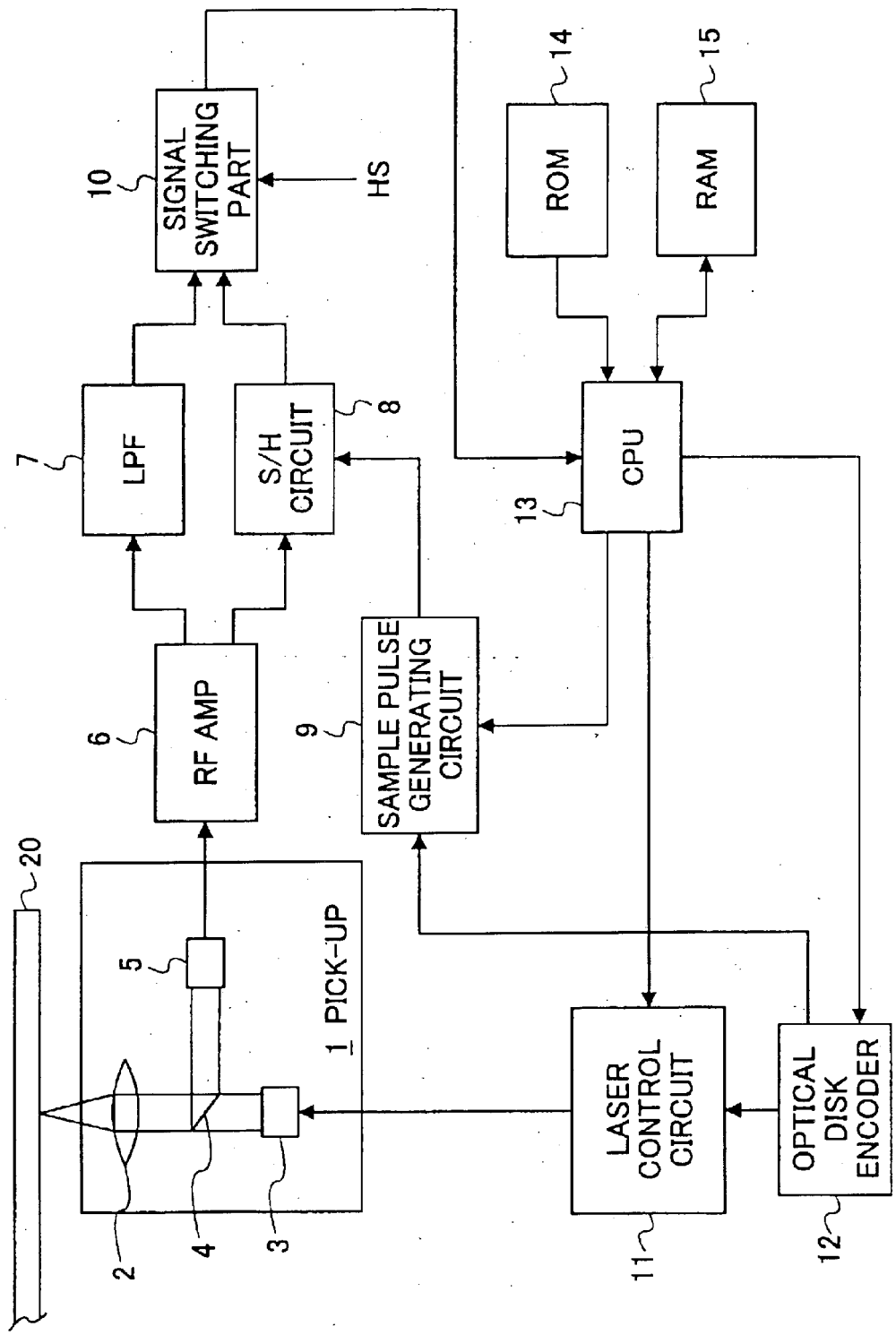
FIG. 1 is a block diagram showing a composition of an optical disc apparatus according to an embodiment of the present invention.

A description will now be given, with reference to FIG. 1, of an optical disc apparatus according to an embodiment of the present invention. FIG. 1 is a block diagram showing a composition of an optical disc apparatus according to the embodiment of the present invention.

An optical amount control device, which is a control part of the optical disc apparatus shown in FIG. 1, is realized by using a microcomputer. The control part comprises a pickup 1, an RF amplifier 6, a low-pass filter (LPF) 7, a sample hold (S/H) circuit 8, a sample pulse generating circuit 9, a signal change part 10, a laser control circuit 11, an optical disc encoder 12, a central processing unit (CPU) 13, a random access memory (ROM) 14, and a random access memory (RAM) 15. The optical disc apparatus has an optical disc 20, which is an optical information recording media such as a CD-R/RW. Informational recording, reproduction, and erasure are performed by focusing a laser beam (optical beam) emitted by a semiconductor laser light source (LD) 3 on a record film of the optical disc 20 by an object lens 2.

A laser diode (LD) 3 is mounted on the pickup 1. The laser diode 3 generates a laser beam having a power according to a drive current supplied by a laser control circuit 11. The laser beam is guided to a recording surface of the optical disc 20. Moreover, the laser beam reflected by the optical disc 20 is deflected by a half mirror 4, and is incident on a photodetector (PD) 5. The photodetector 5 detects a power level of the reflected light. The composition of the above-mentioned pickup 1 is well-known, and the detailed explanation will be omitted. In addition, although another optical detector (referred to as a front photodetector) for detecting a power of the optical disc is mounted on the pickup 1, illustration and detailed explanation are omitted since it is not directly related to the present invention.

When recording information on the optical disc 20, the optical disc encoder 12 generates, according to an instruction from the CPU 13, pulses for record in response to a predetermined record speed, and sends the generated pulses to the laser control circuit 11. The laser control circuit 11 outputs to the laser diode 3, which is a semiconductor laser light source, a current set by the CPU 13 so that a desired light-emitting power is obtained.

The RF amplifier 6 amplifies the reflected light signal, which has been subjected to optoelectric conversion by the photodetector 5, and outputs the amplified signal to the sample hold (S/H) circuit 8. In accordance with a sampling pulse ROPCsample, the S/H circuit 8 samples the signal level value of the reflected light from the RF amplifier 6, and holds the signal level value. If the optical disc 20 is a CD-R, the sampling pulse ROPCsample is generated at a part where the record power level becomes a second optical amount level P2 as shown in FIG. 2-(b) and FIG. 4-(b).

In a case of a CD-R, a record mark is formed according to the second optical amount level value P2, and a space is formed according to a first optical amount level value which is a reproduction power. The record mark is formed according to the second optical amount level value P2 as shown in FIG. 4-(b). Further, as shown in FIG. 2-(b), a clear leading edge of the record mark may be formed by generating a third optical amount level value P3 at the beginning of the second optical amount level value P2.

In any case, the S/H circuit 8 outputs a signal level value of the reflected light at timing according to the second optical amount level value P2. The low-pass filter 7 passes a low-band component of the monitor signal so as to detect an average value of the signal level value of the RF amplifier 6. Since the average value of the reflected light is close to a RFave level as shown in FIG. 2-(c) and FIG. 4-(c), an output of the low-pass filter 7 becomes a level corresponding to the RFave level. If an average duty of a space (erasure mark) is uniform, and a timing for generating the first to third optical amount level values P1, P2 and P3 of the power level, that is, a modulation timing is known, the RFave level cannot be determined uniquely. This is because the reflected light under recording greatly fluctuates as indicated by the reflected light output shown in FIG. 2-(b) and FIG. 4-(b), and there is a large difference in the behavior of the change between light-emitting powers for recording or materials forming the optical disc 20 (for example, a difference between a cyanine base record film and a phthalocyanine base record film).

The signal change part (selector) 10 performs a switching operation to select and output one of the signal level value from the S/H circuit 8 and the signal level value from the low-pass filter 7 in accordance with a select instruction HS (select high speed). In the switching operation, the select instruction HS is set to zero (HS=0) when a recording speed for the optical disc 20 is low so as to select the output of the S/H circuit 8. When the recording speed for the optical disc 20 is high, the switching operation is performed so that the output of the low-pass filter 7 is selected by setting the select instruction HS to 1 (HS=1). Therefore, when the digital modulation rate of the laser diode 3 is high, the average value means of the reflected light signal achieved by the low-pass filter 7 is used without using the S/H circuit 8.

In the running OPC control process performed by the optical disc apparatus, the light emitted by the laser diode 3 before recording information on the optical disc 20 is irradiated onto the optical disc 20 at the time of carrying out the optical power calibration. The signal level value of the reflected light is detected by the low-pass filter 7 or the S/H circuit 8. The detected signal level value is retained by the RAM 15 as a reference level value.

Then, the low-pass filter 7 and/or the S/H circuit 8 detects the signal level value of the laser light of the laser diode 3 reflected by the optical disc 20 after starting to record information on the optical disc 20. The CPU 13 compares the detected signal level value with the reference value retained by the RAM 15, and obtains an optimum laser power drive current by computing so as to equalize the detected signal level value to the reference level value in accordance with a predetermined computation program stored in the ROM 14. The CPU 13 sets the drive current value with respect to the laser control circuit 11, and the laser control circuit 11 causes the laser diode 3 to emit a light based on the drive current value set by the CPU 13.

That is, the laser control circuit 11 and the CPU 13 together function as light source driving means. The object lens 2, the half mirror 4, the photodetector 5, the RF amplifier 6, the low-pass filter 7, the S/H circuit 8 and the CPU 13 together function as anterior reflected light signal level detecting means and posterior reflected light signal level detecting means.

Additionally, the RAM 15 functions as reference level value retaining means. The CPU 13 functions as comparing means. The laser control circuit 11 and the CPU 13 together function as drive current adjusting means. Moreover, the S/H circuit 8 functions as first reflected light signal level value detecting means, and the low-pass filter 7 functions as second reflected light signal level value detecting means. Further, the signal change part 10 functions as detection place selecting means.

In addition, in the above-mentioned optical disc apparatus, a laser current value, which is required when the laser diode 3 is emitting a light at the first optical amount level value P1 of the light-emitting power, may be preferably retained so as to provide the retained value as an input signal IP1 during recording. A description of means for controlling the reproduction power to maintain at the first optical level value P1 is omitted since known power controlling means can be used. For example, the light-emitting power monitor signal at the first optical amount level value P1 is compared with the reference level value, and a result of the comparison is amplified and provided to the laser control circuit 11 as the input signal IP1. It is preferable to hold the level value of the input signal IP1 by a suitable memory means. For example, the level value of the input signal may be digitized by an A/D converter and held by a latch circuit, and, then, the digital input signal may be returned to an analog signal by a D/A converter. Such a method is well-known technology, and a detailed description thereof will be omitted.

A description will now be given of a process for emitting a light at the third optical amount level value. In a case of a recordable optical disc such as a CD-R, the laser diode 3 is driven to emit a light at a power according to the first optical amount level value P1 as a power for reproduction. Additionally, the laser diode 3 is driven to emit a light at a power as a recording power according to the second optical amount level value which is greater than the first optical amount level value and a power according to the third optical amount level value which is greater than the second optical amount level value 2. The third optical amount level value P3 is generated by calculating the level signal IP3 based on an efficiency value, which is a laser efficiency (a ratio of a power to a current) calculated based on the level signal IP2 corresponding to a drive current value for generating the second optical amount level value P2. A process for calculating the efficiency is explained below. The efficiency value can be obtained according to the following equation based on the level signal IP2, which is needed when the laser diode 3 is emitting a light at the second optical level value P2 and the level signal IP1 needed when the laser diode 3 is emitting a light at the first optical amount level value P1.

$$\text{efficiency value} = (P2-P1)/(IP2-IP1)$$

As shown in the FIG. 5, the efficiency value corresponds to an inclination of the straight part. Thus, the level signal IP3 required for driving the laser diode 3 to emit a light at the third optical amount level value P3 can be obtained by the following equation.

$$\text{Level signal } IP3 = IP1 + (P3-P1)/\text{efficiency value}$$

Therefore, the running OPC control can be accurately performed in accordance with the level signal IP3 in addition to the level signal IP2 by calculation by assuming the laser power of the level signal IP2 and the level signal IP3.

A description will now be given of a case in which the optical disc 20 for recording information is changed.

In a recordable type optical disc such as a CD-R, it is well known that the recording power needed when forming pits corresponding to the same information and a width of an optical pulse is different when the optical disc uses a cyanine base colorant and when the optical disc uses a phthalocyanine base colorant. Furthermore, a change in the reflected light output is increased when the recording power is increased, which results in a decrease in the recording pulse width for forming pits on the optical disc. In such a case, the width of the ROPCsample pulse is also reduced. Therefore, unless the accuracy of the sample hold circuit is high, accurate detection cannot be performed and the running OPC cannot be performed appropriately. However, by detecting an average value by the low-pass filter, an accurate running OPC can be performed without using a highly accurate sample hold circuit.

The optical disc apparatus of the present embodiment can also be incorporated into an information processing apparatus such as a personal computer. Moreover, the present invention is also applicable to an optical amount control device for adjusting a light-emitting power of a light source such as a laser diode. Furthermore, in the above-mentioned process, although the case of the two values and three values as the optical amount level are explained, the drive current can also be adjusted based on the optical amount level values of other kinds.

As mentioned above, in the present embodiment, since the monitor by sampling and the monitor by average value are changed according to the recording speed without using a high-rate sampling circuit, a high-rate modulation can be performed, and the light source can be controlled to an optimal light-emitting power in either a low-speed recording or a high-speed recording.

Moreover, since a high-rate modulation can be achieved without using a high-rate sampling circuit, a manufacturing cost of the apparatus can be reduced. Furthermore, an accurate running OPC can be performed at both a low speed and a high speed. Moreover, the monitor according to the sampling circuit or the monitor according to the average value means can be switched based on the speed which the sampling circuit can achieve, and a control for a desired power can be achieved using either of the monitoring method. Furthermore, since the power can be generated at three values, the running OPC capable of versatile applications can be achieved. Furthermore, stable running OPC can be achieved if the light-emitting power or a strategy is changed due to change of a kind of an optical disc.

The present invention is not limited to the specifically disclosed embodiments, and variations and modifications may be made without departing from the scope of the present invention.

The present application is based on Japanese priority application No. 2000-364494 filed on Nov. 30, 2000, the entire contents of which are hereby incorporated by reference.

What is claimed is:

1. A light amount control device comprising:

light source driving means for driving a light source to emit a light at a first optical amount level value and a second optical amount level value greater than the first optical amount level value;

anterior reflected light signal level detecting means for irradiating the light emitted from said light source onto a recording medium and detecting a signal level value of the reflected light reflected by said recording medium before recording information on said recording medium;

reference level value retaining means for retaining the detected signal level value as a reference level value;

posterior reflected light signal level detecting means for irradiating the light emitted from said light source onto said recording medium and detecting a signal level value of the reflected light reflected by said recording medium after starting information recording on said recording medium;

comparing means for comparing the detected signal level value with the reference level value retained by said reference level value retaining means; and drive current adjusting means for adjusting a drive current which drives said light source to emit the light based on a result of the comparison of said comparing means, wherein each of said anterior reflected light signal level value detecting means and said posterior reflected light signal level value detecting means includes:

first reflected light signal level value detecting means for detecting the second optical amount level value of the reflected light reflected by said recording medium;

second reflected light signal level value detecting means for detecting an average value of the signal level value of the light emitted by said light source; and detection place selecting means for selecting one of outputs of the first reflected light signal level value detecting means and the second reflected light signal level value detecting means in accordance with an instruction for selection.

2. The light amount control device as claimed in claim 1, wherein the instruction for selection is determined based on a digital modulation rate of said light source.

3. The light amount control device as claimed in claim 2, wherein the instruction for selection is determined so as to cause said detection place selecting means to select the output of said first reflected light signal level value detecting means when the digital modulation rate of said light source is low, and to select the output of said second reflected light signal level value detecting means when the digital modulation rate of said light source is high.

4. The light amount control device as claimed in claim 1, wherein the instruction for selection is determined based on a kind of said recording medium.

5. A light amount control device comprising:
   light source driving means for driving a light source to emit a light at a first optical amount level value, a second optical amount level value greater than the first optical amount level value and a third optical amount level value greater than the second optical amount level value;
   anterior reflected light signal level detecting means for irradiating the light emitted from said light source onto a recording medium and detecting a signal level value of the reflected light reflected by said recording medium before recording information on said recording medium;
   reference level value retaining means for retaining the detected signal level value as a reference level value;
   posterior reflected light signal level detecting means for irradiating the light emitted from said light source onto said recording medium and detecting a signal level value of the reflected light reflected by said recording medium after starting recording information on said recording medium;
   comparing means for comparing the detected signal level value with the reference level value retained by said reference level value retaining means; and
   drive current adjusting means for adjusting a drive current which drives said light source to emit the light based on a result of the comparison of said comparing means,
   wherein each of said anterior reflected light signal level value detecting means and said posterior reflected light signal level value detecting means includes:
   first reflected light signal level value detecting means for detecting one of the second optical amount level value and the third optical amount level value of the reflected light reflected by said recording medium;
   second reflected light signal level value detecting means for detecting an average value of the signal level value of the light emitted by said light source; and
   detection place selecting means for selecting one of outputs of the first reflected light signal level value detecting means and the second reflected light signal level value detecting means in accordance with an instruction for selection, and
   wherein said drive current adjusting means includes means for adjusting the drive current supplied to said light source so as to cause said light source to emit the light at the reference level value in accordance with a result of comparison of said comparing means when said light source emits the light at the second optical amount level value, and for adjusting the drive current supplied to said light source so as to cause said light source to emit the light at the third reference level value in accordance with an efficiency value obtained by a relationship between a value corresponding to the second optical level value and a value corresponding to the drive current.

6. The light amount control device as claimed in claim 5, wherein the instruction for selection is determined based on a digital modulation rate of said light source.

7. The light amount control device as claimed in claim 6, wherein the instruction for selection is determined so as to cause said detection place selecting means to select the output of said first reflected light signal level value detecting means when the digital modulation rate of said light source is low, and to select the output of said second reflected light signal level value detecting means when the digital modulation rate of said light source is high.

8. The light amount control device as claimed in claim 5, wherein the instruction for selection is determined based on a kind of said recording medium.

9. An information recording apparatus for recording information on a recording medium by irradiating a light from a light source, said information recording apparatus comprising:
   light source driving means for driving said light source to emit a light at a first optical amount level value and a second optical amount level value greater than the first optical amount level value;
   anterior reflected light signal level detecting means for irradiating the light emitted from said light source onto said recording medium and detecting a signal level value of the reflected light reflected by said recording medium before recording information on said recording medium;
   reference level value retaining means for retaining the detected signal level value as a reference level value;
   posterior reflected light signal level detecting means for irradiating the light emitted from said light source onto said recording medium and detecting a signal level value of the reflected light reflected by said recording medium after starting recording information on said recording medium;
   comparing means for comparing the detected signal level value with the reference level value retained by said reference level value retaining means; and
   drive current adjusting means for adjusting a drive current which drives said light source to emit the light based on a result of the comparison of said comparing means,
   wherein each of said anterior reflected light signal level value detecting means and said posterior reflected light signal level value detecting means includes:
   first reflected light signal level value detecting means for detecting the second optical amount level value of the reflected light reflected by said recording medium;
   second reflected light signal level value detecting means for detecting an average value of the signal level value of the light emitted by said light source; and
   detection place selecting means for selecting one of outputs of the first reflected light signal level value detecting means and the second reflected light signal level value detecting means in accordance with an instruction for selection.

10. The information recording apparatus as claimed in claim 9, wherein the instruction for selection is determined based on a digital modulation rate of said light source.

11. The information recording apparatus as claimed in claim 10, wherein the instruction for selection is determined so as to cause said detection place selecting means to select the output of said first reflected light signal level value detecting means level when the digital modulation rate of said light source is low, and to select the output of said second reflected light signal level value detecting means when the digital modulation rate of said light source is high.

12. The information recording apparatus as claimed in claim 9, wherein the instruction for selection is determined based on a kind of said recording medium.

13. The information recording apparatus as claimed in claim 9, wherein said information recording apparatus is configured and arranged to be incorporated into a computer.

14. An information recording apparatus for recording information on a recording medium by irradiating a light from a light source, said information recording apparatus comprising:

light source driving means for driving said light source to emit a light at a first optical amount level value, a second optical amount level value greater than the first optical amount level value and a third optical amount level value greater than the second optical amount level value;

anterior reflected light signal level detecting means for irradiating the light emitted from said light source onto said recording medium and detecting a signal level value of the reflected light reflected by said recording medium before recording information on said recording medium;

reference level value retaining means for retaining the detected signal level value as a reference level value;

posterior reflected light signal level detecting means for irradiating the light emitted from said light source onto said recording medium and detecting a signal level value of the reflected light reflected by said recording medium after starting recording information on said recording medium;

comparing means for comparing the detected signal level value with the reference level value retained by said reference level value retaining means; and drive current adjusting means for adjusting a drive current which drives said light source to emit the light based on a result of the comparison of said comparing means, wherein each of said anterior reflected light signal level value detecting means and said posterior reflected light signal level value detecting means includes:

first reflected light signal level value detecting means for detecting one of the second optical amount level value and the third optical amount level value of the reflected light reflected by said recording medium;

second reflected light signal level value detecting means for detecting an average value of the signal level value of the light emitted by said light source; and detection place selecting means for selecting one of outputs of the first reflected light signal level value detecting means and the second reflected light signal level value detecting means in accordance with an instruction for selection, and wherein said drive current adjusting means includes means for adjusting the drive current supplied to said light source so as to cause said light source to emit the light at the reference level value in accordance with a result of comparison of said comparing means when said light source emits the light at the second optical amount level value, and for adjusting the drive current supplied to said light source so as to cause said light source to emit the light at the third optical amount level value in accordance with an efficiency value obtained by a relationship between a value corresponding to the second optical level value and a value corresponding to the drive current.

15. The information recording apparatus as claimed in claim 14, wherein the instruction for selection is determined based on a digital modulation rate of said light source.

16. The information recording apparatus as claimed in claim 15, wherein the instruction for selection is determined so as to cause said detection place selecting means to select the output of said first reflected light signal level value detecting means when the digital modulation rate of said light source is low, and to select the output of said second reflected light signal level value detecting means when the digital modulation rate of said light source is high.

17. The information recording apparatus as claimed in claim 14, wherein the instruction for selection is determined based on a kind of said recording medium.

18. The information recording apparatus as claimed in claim 14, wherein said information recording apparatus is configured and arranged to be incorporated into a computer.

\* \* \* \* \*